(12) United States Patent
Atzmon et al.

(10) Patent No.: US 8,108,693 B2
(45) Date of Patent: Jan. 31, 2012

(54) METHOD FOR DATA STORAGE PROTECTION AND ENCRYPTION

(75) Inventors: Elisha Atzmon, Tel-Aviv (IL); Giora Cohen, Bnei-Dror (IL); David Saar, Netanya (IL)

(73) Assignee: GED-I Ltd., Netanya (IL)

( * ) Notice: Subject to any disclaimer, the term of this patent is extended or adjusted under 35 U.S.C. 154(b) by 954 days.

(21) Appl. No.: 11/910,393

(22) PCT Filed: Mar. 30, 2006

(86) PCT No.: PCT/IL2006/000411
§ 371 (c)(1),
(2), (4) Date: Oct. 1, 2007

(87) PCT Pub. No.: WO2006/103679
PCT Pub. Date: Oct. 5, 2006

(65) Prior Publication Data
US 2008/0151740 A1    Jun. 26, 2008

(51) Int. Cl.
G06F 11/30 (2006.01)
H04L 29/06 (2006.01)
(52) U.S. Cl. .................. 713/193; 713/164; 713/189
(58) Field of Classification Search .............. 713/193, 713/164, 189
See application file for complete search history.

(56) References Cited

U.S. PATENT DOCUMENTS

| | | | |
|---|---|---|---|
| 4,780,905 A | 10/1988 | Cruts et al. | |
| 4,819,153 A * | 4/1989 | Graham et al. | 360/69 |
| 4,827,462 A * | 5/1989 | Flannagan et al. | 369/30.09 |
| 4,937,861 A | 6/1990 | Cummins | |
| 5,007,082 A | 4/1991 | Cummins | |
| 5,027,396 A | 6/1991 | Platteter et al. | |
| 5,327,563 A | 7/1994 | Singh | |
| 5,343,525 A | 8/1994 | Hung et al. | |
| 5,463,565 A * | 10/1995 | Cookson et al. | 711/113 |
| 5,513,262 A | 4/1996 | van Rumpt et al. | |
| 5,523,903 A * | 6/1996 | Hetzler et al. | 360/77.08 |
| 5,805,551 A * | 9/1998 | Oshima et al. | 705/57 |
| 5,809,007 A * | 9/1998 | Takemura et al. | 369/275.3 |
| 5,870,468 A | 2/1999 | Harrison | |
| 6,008,960 A * | 12/1999 | Belser | 360/48 |
| 6,185,666 B1 * | 2/2001 | Murray et al. | 711/173 |
| 6,189,099 B1 | 2/2001 | Rallis et al. | |
| 6,199,163 B1 | 3/2001 | Dumas et al. | |
| 6,240,183 B1 | 5/2001 | Marchant | |

(Continued)

FOREIGN PATENT DOCUMENTS

CN    1064164 A    2/2002

(Continued)

OTHER PUBLICATIONS

International Search Report, International Report on Patentability and Written Opinion issued in PCT/IL2006/000411.

(Continued)

*Primary Examiner* — Techane Gergiso
(74) *Attorney, Agent, or Firm* — Browdy and Neimark, PLLC

(57) ABSTRACT

Methods for data storage protection and encryption are disclosed. In some of these methods, the method may include any of the following, among other things, storing information about the storage format to a Geometrical Cell Location Table (GCLT), shuffling a Geometrical Cell Location Table giving rise to a Shuffled Geometrical Cell Location Table (SGCLT), encrypting data using more than one key, renewing content, and/or filling empty sectors with encrypted data.

33 Claims, 17 Drawing Sheets

U.S. PATENT DOCUMENTS

| | | |
|---|---|---|
| 6,468,160 B2 | 10/2002 | Eliott |
| 6,473,861 B1 | 10/2002 | Stokes |
| 6,490,683 B1 * | 12/2002 | Yamada et al. ............... 713/176 |
| 6,683,954 B1 | 1/2004 | Searle |
| 6,687,825 B1 | 2/2004 | Challener et al. |
| 6,735,693 B1 | 5/2004 | Hamlin |
| 7,146,507 B2 | 12/2006 | Shindo |
| 7,191,344 B2 | 3/2007 | Lin et al. |
| 7,200,546 B1 * | 4/2007 | Nourmohamadian et al. . 703/24 |
| 7,372,962 B2 | 5/2008 | Fujimoto et al. |
| 7,380,134 B2 | 5/2008 | Yamada |
| 7,434,069 B2 | 10/2008 | Nessler |
| 7,716,746 B2 | 5/2010 | Hori et al. |
| 2001/0009580 A1 | 7/2001 | Ikeda |
| 2001/0025340 A1 | 9/2001 | Marchant |
| 2002/0199099 A1 | 12/2002 | Taizo et al. |
| 2003/0070083 A1 | 4/2003 | Nessler |
| 2003/0072447 A1 | 4/2003 | Saliahov |
| 2003/0182564 A1 | 9/2003 | Lai et al. |
| 2003/0200452 A1 * | 10/2003 | Tagawa et al. ................ 713/193 |
| 2004/0052177 A1 * | 3/2004 | Maegawa ................... 369/47.51 |
| 2004/0088478 A1 * | 5/2004 | Hall ............................... 711/112 |
| 2004/0190407 A1 * | 9/2004 | Nobukuni et al. ........... 369/47.1 |
| 2004/0193899 A1 | 9/2004 | Satake et al. |
| 2004/0268033 A1 | 12/2004 | Kokhoe |
| 2005/0047594 A1 | 3/2005 | Cho et al. |
| 2005/0058034 A1 * | 3/2005 | Ando et al. ................. 369/47.27 |
| 2005/0223240 A1 | 10/2005 | Miles |
| 2005/0240756 A1 * | 10/2005 | Mayer ............................... 713/2 |
| 2005/0259458 A1 | 11/2005 | Rustagi et al. |
| 2007/0180257 A1 | 8/2007 | Bae et al. |

FOREIGN PATENT DOCUMENTS

| | | |
|---|---|---|
| CN | 1419195 A | 5/2003 |
| CN | 1193297 C | 3/2005 |
| CN | 1704913 A | 12/2005 |
| DE | 102 14 127 B4 | 10/2002 |
| EP | 0 885 417 A2 | 12/1998 |
| EP | 0 911 738 A2 | 4/1999 |
| EP | 1 267 245 A2 | 12/2002 |
| EP | 1 389 750 A1 | 2/2004 |
| EP | 1 492 105 A2 | 12/2004 |
| EP | 1 536 307 A1 | 6/2005 |
| EP | 1 585 006 A2 | 10/2005 |
| EP | 1615368 A1 | 1/2006 |
| FR | 2 824 649 | 11/2002 |
| GB | 2355106 A1 | 4/2001 |
| GB | 2 376 775 A | 12/2002 |
| GB | 2 419 434 A | 4/2006 |
| JP | 2000076136 A | 3/2000 |
| JP | 2002-203368 A | 7/2002 |
| JP | 2004-199229 A | 7/2002 |
| JP | 2002-351742 A | 12/2002 |
| JP | 2005-172866 | 6/2005 |
| TW | 508494 B | 11/2002 |
| WO | 03/027816 A1 | 4/2003 |
| WO | 2004093379 A1 | 10/2004 |
| WO | 97/29416 | 8/2007 |

OTHER PUBLICATIONS

"Disk Encryption Remains Best Safeguard to Protect Enterprise Data—GuardianEdge's Encryption Anywhere Hard Disk Encrypts Laptops, Denies Unauthorized Access to Data and Networks", http://www.guardianedge.com/news/press-releases/2006/january-26.php (Jan. 26, 2006).

"Hard Disk Drive Reference Guide", Storage Review.com (http://www.storagereview.com/hard_disk_drive_reference_guide (Mar. 16, 2010).

"NTFS—New Techology File System designed for Windows 7, Vista, XP, 2008, 2003, 2000, NT", http://www.ntfs.com (1998-2010).

Biggs, "Disk Lockdown—Two disk encryption products provide last line of defense", Federal Computer Week, vol. 19, No. 2; http://www.guardianedge.com/news/in-the-news/january-24/2005.php (Jan. 24, 2005).

"SafeBoot data encryption technology now supports IBM Rescue and Recovery with rapid restore", Software Industry Report, vol. 37, No. 6; http://www.allbusiness.com/technology/computer-software/379497-1.html (Mar. 25, 2005).

Rubenking, "Encryption Plus Hard Disk 7.1", PC Magazine http://www.pcmag.com/article2/0,2817,1713105,00.asp Home> Product Guides> Software Security> Encryption> Encryption Plus Hard Disk 7.1 (Nov. 4, 2004).

Scofield and Bergman-Terrell, "Sensitive Data & the .NET Crypto API"; http://www.drdobbs.com/184405938;jsessionid=SLKIPPKQHQHQJQE1GHPSKHWATMY32JVN (Dec. 1, 2004).

Hayes, "Invisible Encryption" ComputerWorld, vol. 39, No. 24, (Jun. 13, 2005).

"Data Theft Spurs Demand for Encryption", Int J Micrograph Opt Technol, vol. 23, Nos. 5 & 6, pp. 5-6 (2005).

Caloyannides, "Keeping Offline Computer Usage Private", IEEE Security & Privacy—published by the IEEE Computer Society, vol. 1, No. 5, pp. 93-95 (Sep./Oct. 2003).

"Encryption Anywhere Hard Disk", by the GuardianEdge Technologies Inc. (Sep. 2006).

http://www.computerworld.com/s/article/102775/News Briefs, "Seagate to Boost Disk Drive Security", Jun. 27, 2005.

"Preventative Rewrites", IBM Technical Disclosure bulletin, International Business Machines Corp. Thornwood, US, vol. 33, No. 12, pp. 331-332, May 1991.

* cited by examiner

| 0,3 | 0,4 |
|---|---|
| 0 | 0 |
| 0 | 1 |
| 1 | 0 |
| 0 | 0 |
| 1 | 1 |
| 1 | 1 |
| 1 | 8,4 |
| 0 | 0 |
| 0 | 1 |
| 1 | 0 |
| 0 | |

Figure 2A

| 0,1 | 0,2 | 0,3 |
|---|---|---|
| 0 | 1 | 0 |
| 0 | 0 | 0 |
| 0 | 1 | 0 |
| 0 | 0 | 0 |
| 1 | 1 | 1 |
| 0 | 0 | 0 |
| 1 | 1 | 1 |
| 0 | 0 | 1 |
| 1 |   | 0 |

Figure 3A

| LBA | SLBA | Encryption Keys | Status |
|---|---|---|---|
| 1 | 2 | 2,19 | 0 |
| 2 | 1 | 27,3 | 0 |
| 3 | 6 | 15,1 | 1 |
| 4 | 4 | 6,21 | 1 |
| 5 | 3 | 3,3 | 0 |
| 6 | 5 | 14,13 | 0 |

Figure 5B

METHOD FOR DATA STORAGE PROTECTION AND ENCRYPTION

FIELD OF THE INVENTION

The present invention is in the general field of data storage protection and encryption.

BACKGROUND OF THE INVENTION

Data or information encryption has a long history of thousands of years. Today's communication and information world, which follow so far the Moore law, increases the need for security.

Data resides on storage media accessible to and used by applications, that run on computers that are connected by networks (LAN, WAN, Internet, Intranet, etc). The common security concept is of layers of security, starting by securing the outer circle (networks) and gradually securing the inner circles such as the computers (by access control products) and the applications themselves. Today's solutions for the outer circles include the intrusion prevention systems (like firewalls), application solutions (like anti-spy, anti-virus, etc.) and physical access control (like keys—biometric, etc.). There are also solutions for the most inner circle i.e. the one of the information itself, based on encryption. However, as will be explained, current solutions are not suitable for large storage media such as disks and tapes.

The problem with current encryption methods for data storage is that almost all methods were derived from encryption methodologies that were specially developed for data transfer (i.e. communication) rather than data storage (i.e. stable, static, etc.). There are many differences between the two and the main ones are summarized in the following table:

TABLE 1

Information nature of communication vs. storage

| | Subject | Communication | Storage |
|---|---|---|---|
| 1. | Data lifetime | Short Duration | Long Duration |
| 2. | Unit Size | Packets | Files, Sectors |
| 3. | Data sensitivity | Usually Low | High |
| 4. | Applicability of Statistical analysis in decryption methods | Low | High |
| 5. | Data ownership | Mostly Shared between the sender and the receiver | For use by the owner only |

Therefore the encryption solutions for data communication were basically developed to be fast and be applicable for a few packets (leading to relatively small key).

National regulations also enforce the communication software manufacturers (and therefore the end users too) to apply only relatively small key for reasons known to all—the authorities must be able to decrypt the data in reasonable time. It should be noted that in the communication world a reasonable time is as close as possible to real time, since the nature of the transferred information is so, especially the information that bothered the authorities.

However, stored information, as presented in the Table 1 is of a different nature than of communication. Stored information is usually privately protected by law (i.e. non shared), is found on large storage media that contain very large amounts of sensitive data (especially in every large organizations).

Here are some fundamental facts regarding data storage media: the information is very sensitive; the storage media contain enormous amounts of data, which would ease the possibility of decryption based on advanced statistical analysis methods and the data is (as a rule) permanent or at least stored for relatively long durations.

These fundamental facts lead us to realize that encryption methods using relatively short keys (as being used in communication) are not sufficient (i.e. do not provide adequate protection) for data storage media.

There is thus a need in the art for a powerful encryption method in order to prevent an unauthorized object to understand the stored information (after reaching an access to it). There is further need in the art to provide an encryption technique which combines a few levels of data protection and encryption. There follows a brief description on how data is stored on a disk.

Disk Structure

As seen in FIG. 1. a hard disk can contain a few physical plates (1) (FIG. 1.$a$), each physical plate is divided to tracks (2) (FIG. 1.$b$), where each track (2) has its own fixed radius. The tracks are then divided to sectors (sometimes called also blocks) (3) (FIG. 1.$c$). The sectors' division of each of the tracks is azimuthally a division of the circle to a fixed number. Once, all the tracks contained the same number of sectors, but today different tracks can have different numbers of sectors (FIG. 1.$f$). Essentially, the disk-tracks and disk-sectors are an outcome of a logical division and are disk dependant. The known disk Format is a disk geometrical mapping of all the areas as defined by the track-sectors. The physical disk (hard drive) can be divided to logical units which are called partitions, where each partition is labeled, and virtually behaves as a physical unit.

RELATED ART

"Encryption Anywhere Hard Disk" of GuardianEdge Technologies Inc.

Abstract:

Encryption Anywhere Hard Disk uses a government certified AES cryptographic algorithm and a 256-bit encryption key to protect 100% of the data on a Windows hard drive—including the master boot record, the operating system files, applications and all data files. The program even encrypts unused sectors of the hard drive to assure air-tight security of computer and network systems.

U.S. patent application no. 20030070083, by Nessler Kai Wilhelm "Method and Device for Encryption/Decryption of Data on Mass Storage Device".

Abstract:

The present invention provides a method and device performing encryption/decryption of data on a mass storage media. A plurality of different encryption/decryption algorithms with associated keys can be utilized on different storage areas of the media, such as blocks/sectors on a hard disk drive, thereby increasing the security of the data significantly. In addition, the present invention provides a method and device that combines said keys with random numbers for a further increase of the security of the data. In a preferred embodiment of the invention, the block/sector number is used to select an algorithm with associated key and random number. The present invention can also be utilized to encrypt/decrypt e-mails, networking traffic etc. and other types of electronic data. In addition, said device provides an authentication session when booting a computer from a hard disk drive, and can even be used to select a certain operating system and/or environment associated with a certain key carrier by changing the Master Boot Record of the disk system.

SUMMARY OF THE INVENTION

The invention provides for a method for formatting of a disk that includes at least one track and the said track is capable of being divided into at least two geometrical cells (GCs), comprising: (a) dividing at least one of the tracks into at least two neighboring geometrical cells (GCs); at least one of said GCs is bordered by at least different internal radius and/or different outer radius compared to the respective radius of a neighboring cell of said track; (b) storing Geometrical Cell Location Table (GCLT), for accessing data in said cells, said accessing includes inserting, updating or deleting data.

The present invention further provides for a method for formatting a disk that includes at least one track and the said track is capable of being divided into at least two geometrical cells (GCs), comprising: (a) dividing at least one of the tracks into at least two neighboring geometrical cells (GCs); at least one of said GCs defining a different angular size compared to the angular size of a neighboring GC of said track; (b) storing Geometrical Cell Location Table (GCLT), for accessing data in said cells, said accessing includes inserting, updating or deleting data In accordance with certain aspects of the invention there is provided a counterpart system.

Yet further provided by the present invention is a method for formatting a disk that includes at least one track and the said track is capable of being divided into at least two geometrical cells (GCs), comprising: (a) dividing at least one of the tracks into geometrical cells (GCs); at least one of said GCs is bordered by at least different internal radius and/or different outer radius compared to the respective radius of a neighboring cell of said track; (b) at least one of said GCs defining a different angular size compared to the angular size of a neighboring GC of said track; (c) storing Geometrical Cell Location Table (GCLT), for accessing data in said cells, said accessing includes inserting, updating or deleting data.

Further provided by the present invention is a method for encrypting data stored in a disk, the disk includes at least two geometrical cells (GCs), comprising: (a) the geometrical cells (GCs) constituting sectors and constructing Logical Block Address (LBA), for facilitating access of sector of interest; (b) reshuffling at least two of said sectors addresses, giving rise to Shuffled LBA (SLBA), such that a sector from among said at least one sectors having a sector address in said LBA will have a different address in said SLBA; said SLBA facilitating access to sector of interest.

Further provided by the present invention is a method for encrypting data stored in a disk, the disk includes at least one track and track is capable of being divided into at least two geometrical cells (GCs), comprising: (a) dividing the disk into tracks and geometrical cells (GCs) constituting sectors and constructing Logical Block Address (LBA), for facilitating access to sector of interest; (b) encrypting data in at least one of said sectors using at least two encryption keys.

The present invention further provides a method for encrypting data stored in a disk, the disk includes at least one track and the said track is capable of being divided into at least two geometrical cells (GCs), comprising: (a) dividing the disk into tracks and geometrical cells (GCs) constituting sectors and constructing Logical Block Address (LBA), for facilitating access of sector of interest; (b) encrypting data in at least two of said sectors using at least two encryption algorithms.

Further provided by the present invention is a method of encrypting data stored to a tape comprising: (a) buffering at least two sectors before storing them to the tape, (b) shuffling the said buffered sector-addresses found in the buffer, (c) storing the information on the said shuffling to a Tape Sectors Shuffling Table (TSST), and (d) storing the shuffled sectors in their new order to the tape.

BRIEF DESCRIPTION OF THE DRAWINGS

For a better understanding, the invention will now be described by way of example only, with reference to the accompanying drawings, in which:

FIG. 2-2A.—illustrates schematically Radial Modification of Sectors Location, in accordance with an embodiment of the invention;

FIG. 3-3A.—illustrates schematically Angular Modification by Two Type of Sectors, in accordance with an embodiment of the invention;

FIG. 5A-5B.—illustrates schematically an Algebraically Encrypted Sectors after Random Scrambling, in accordance with an embodiment of the invention;

FIG. 5.—illustrates schematically the major three levels of Protection & Encryption, in accordance with an embodiment of the invention;

DETAILED DESCRIPTION OF THE INVENTION

Figure 1A:
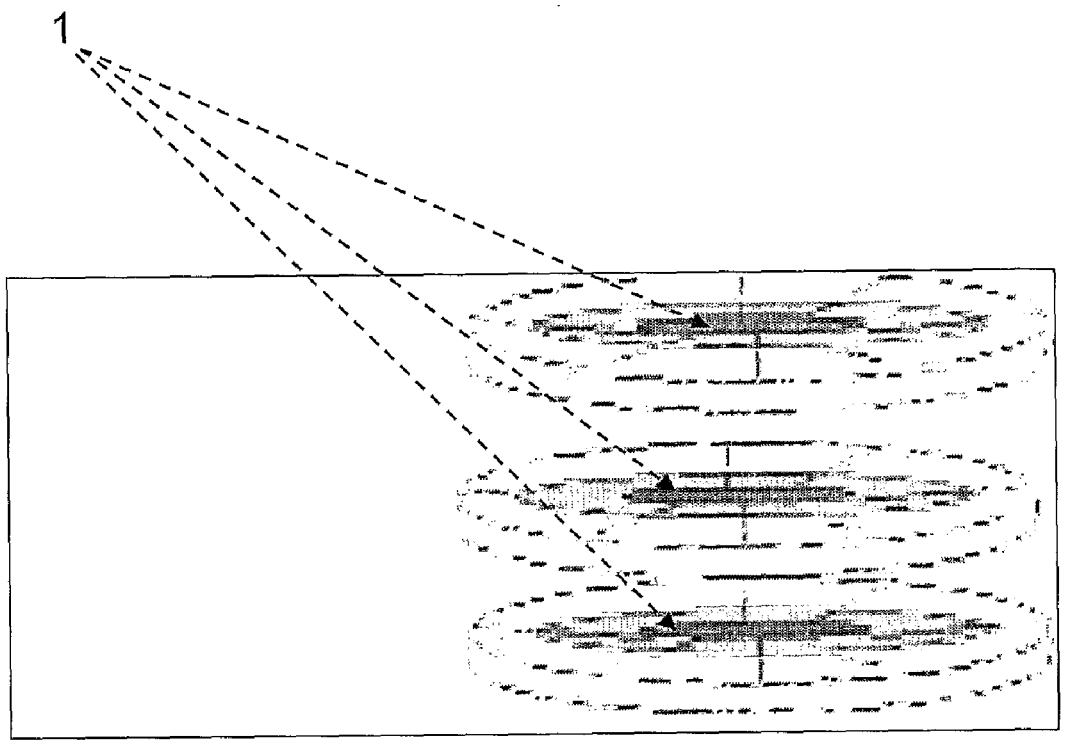
FIGS. 1A-F.—illustrates a Disk Architecture—Physical and Logical Structure, in accordance with the prior art.
Figure 1B:
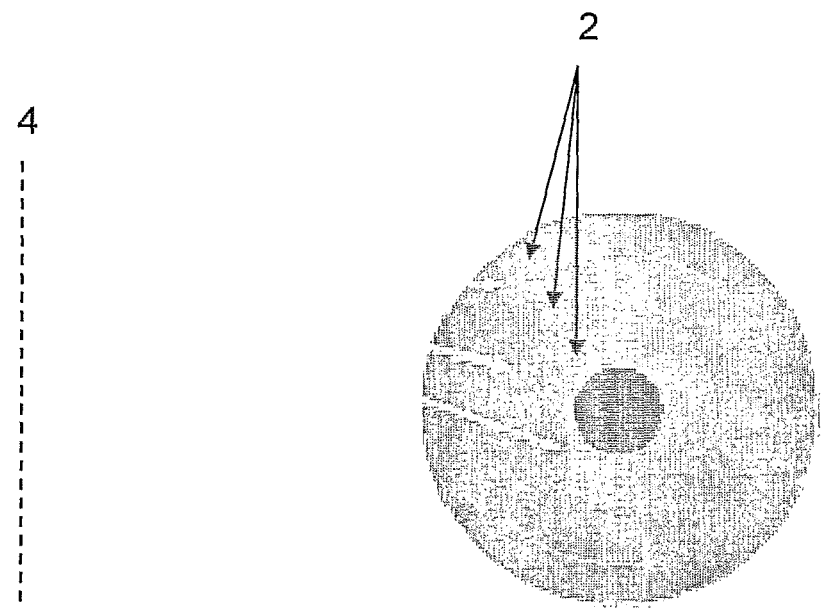
Figure 1D:
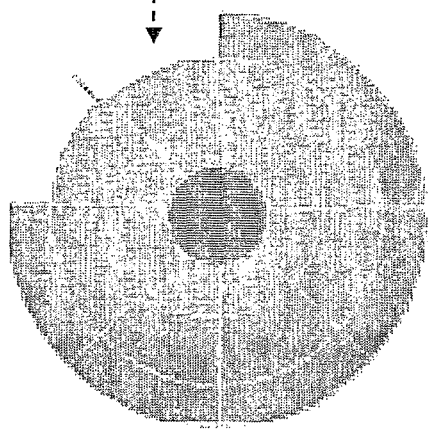
Figure 1C:
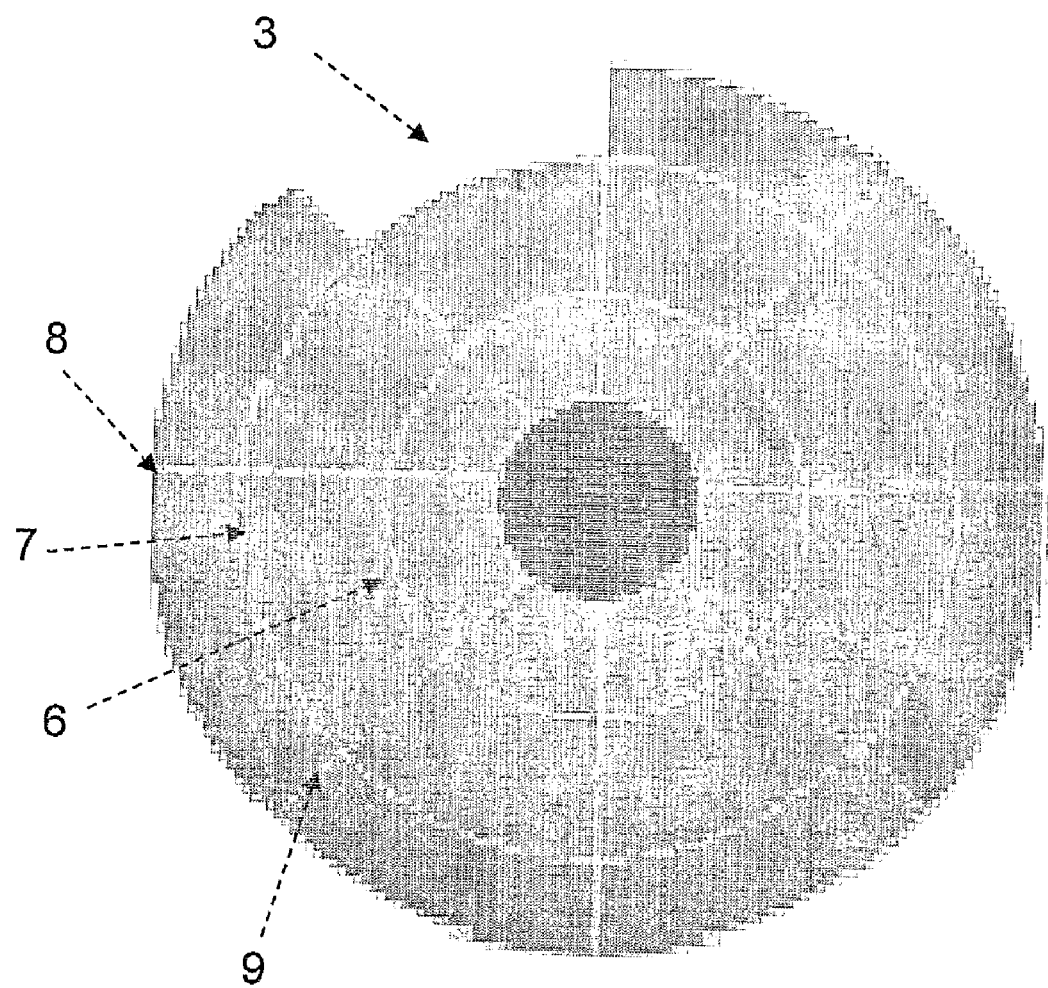
Figure 1E:
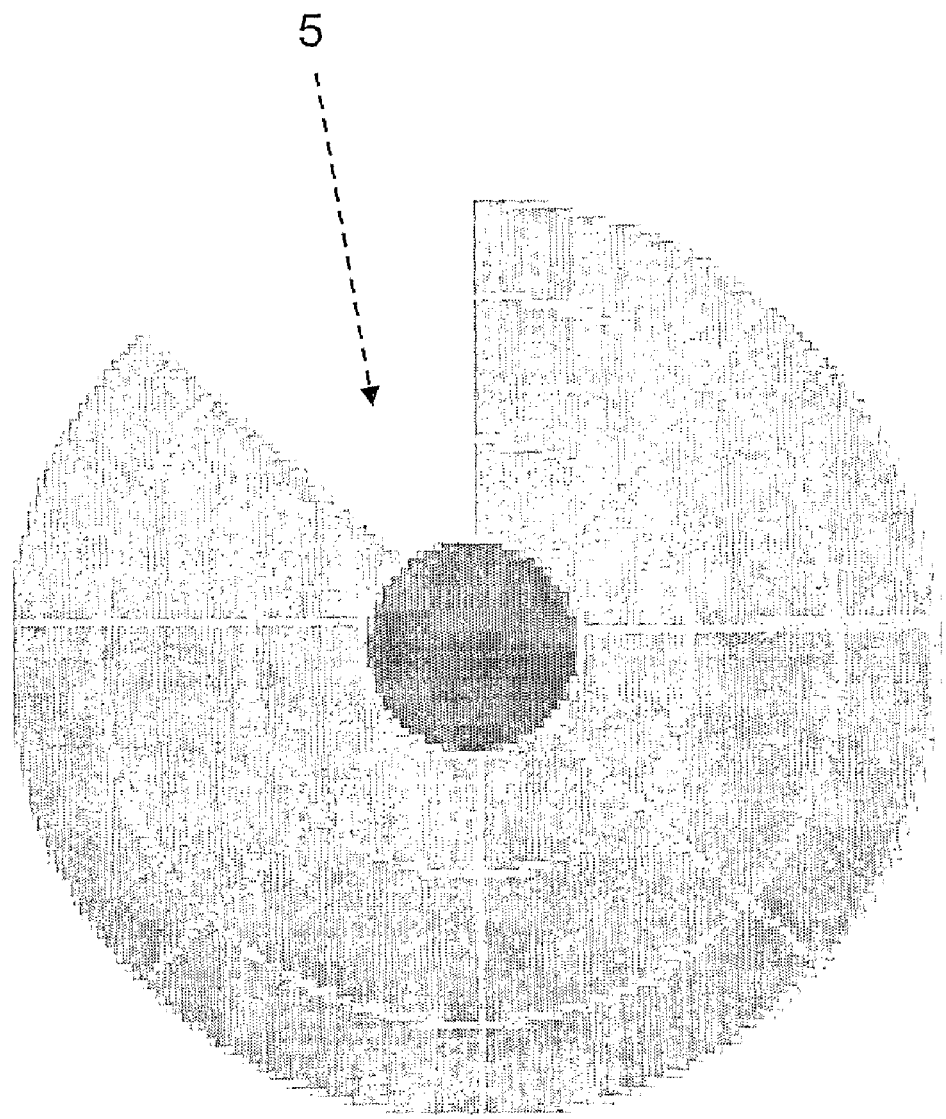
Figure 1F:
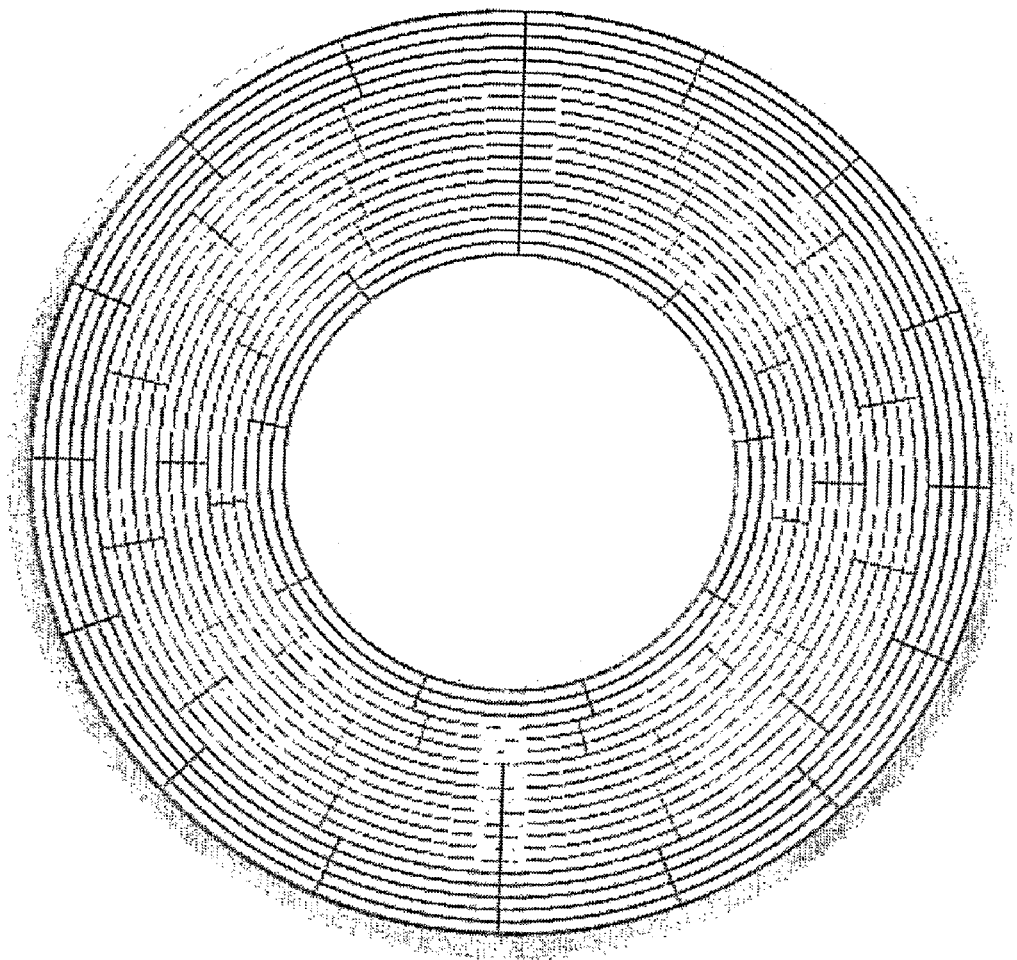

In accordance with an aspect of the invention, there is provided Geometrical Format Modification (GFM). As described above in the background chapter, any disk is formatted in the form illustrated in FIG. 1. The fact that a disk is characterized by cylindrical symmetry causes us to prefer cylindrical coordinates in elaborating on the disk format. The cylindrical coordinates will be denoted by [r, θ], where the r-coordinate and the θ-coordinate stand for the radial dependency and the angular dependency, respectively.

As seen in FIG. 1.; the formatting of the disk (hence the format operation) divides the disk (or a partition) geometrically to cells (3) (i.e. sectors—see FIG. 1.c), where each Geometrical Cell (GC) is bordered by two fixed successive radii (e.g. $r_i$ & $r_{i+1}$—(6), (7) FIG. 1.c) and fixed successive angles (e.g. $\theta_j$ & $\theta_{j+1}$—(8), (9) FIG. 1.c) Once, all tracks had the same number of GCs, and moreover the alignment of the θ-division was preserved through all of the tracks (FIG. 1.c). This of course caused disk-area waste, since sectors in the outer tracks were physically longer. On the other hand, within fixed angular disk speed, each GC is passed through, under the disk arm reader/writer head, at the exact time lap. Today, the disk formatting methods enable more sectors on the outer tracks (FIG. 1.*f*), however on each specific track, the angular division to sectors is of equal θ gap. Thus all sectors are identical in area and shape upon each specific given track. Within this context it should be mentioned that the disk format operation is eventually done on two levels: Low Level Format and High Level Format. As regards to the Low Level Format for disks, it is done by the disk manufacturer and encoded to hardware disk controller, in order to improve disk performance. However, as regards recordable media such as diskettes, CDs, DVDs, etc, the Low Level Format is part of the whole format operation.

In accordance with certain embodiment of the invention, one applies r-modifications to the standard formatting method, while the angular distribution is kept standard. One possible modification with regard to the r frame is:

Some of the GCs on some of the tracks have different radii, whereby the term "some of the one" means "any number out of the total number". See e.g. (21) & (22) FIG. 2 that represent two possible track modifications.

In accordance with certain embodiments of the invention, one applies θ-modifications to the standard formatting method, while the radial distribution is kept standard. Some possible modification with regard to the θ frame eventually means sectors with different angular sizes. It follows that some of the possibilities are:

Some predetermined GC sizes, randomly or periodically alternated within each of the tracks. The order can be either the same for all the tracks, or different for each of the tracks. See e.g. FIG. 3, two angular GC sizes exist (represented by A & B (31), (32) FIG. 3. respectively).

The GCs have no standard sizes. Each GC size is randomly fixed.

In accordance with certain embodiments of the invention, one applies both r-modification & θ-modification simultaneously. Some of the options are: Any combination of r-modification and e-modification, whether, the disk is fully "covered" by the GCs, or even contains empty holes as seen e.g. in (23) FIG. 2. or any GCs disk coverage, other than described, including any option of non periodic GCs coverage. See e.g. FIG. 2.

In accordance with certain embodiments of the invention, one applies empty physical spaces on the disk, i.e. empty areas. The empty areas can be of the same shape and size or of different shapes and sizes (e.g. (23) FIG. 2)

In accordance with certain embodiments of the invention all the information of the new modified formatting method (i.e. GFM) is stored in a way to enable access, reading and writing to the disk. We will denote this table by the term "GCLT"—Geometrical Cell Location Table.

Figure 2:
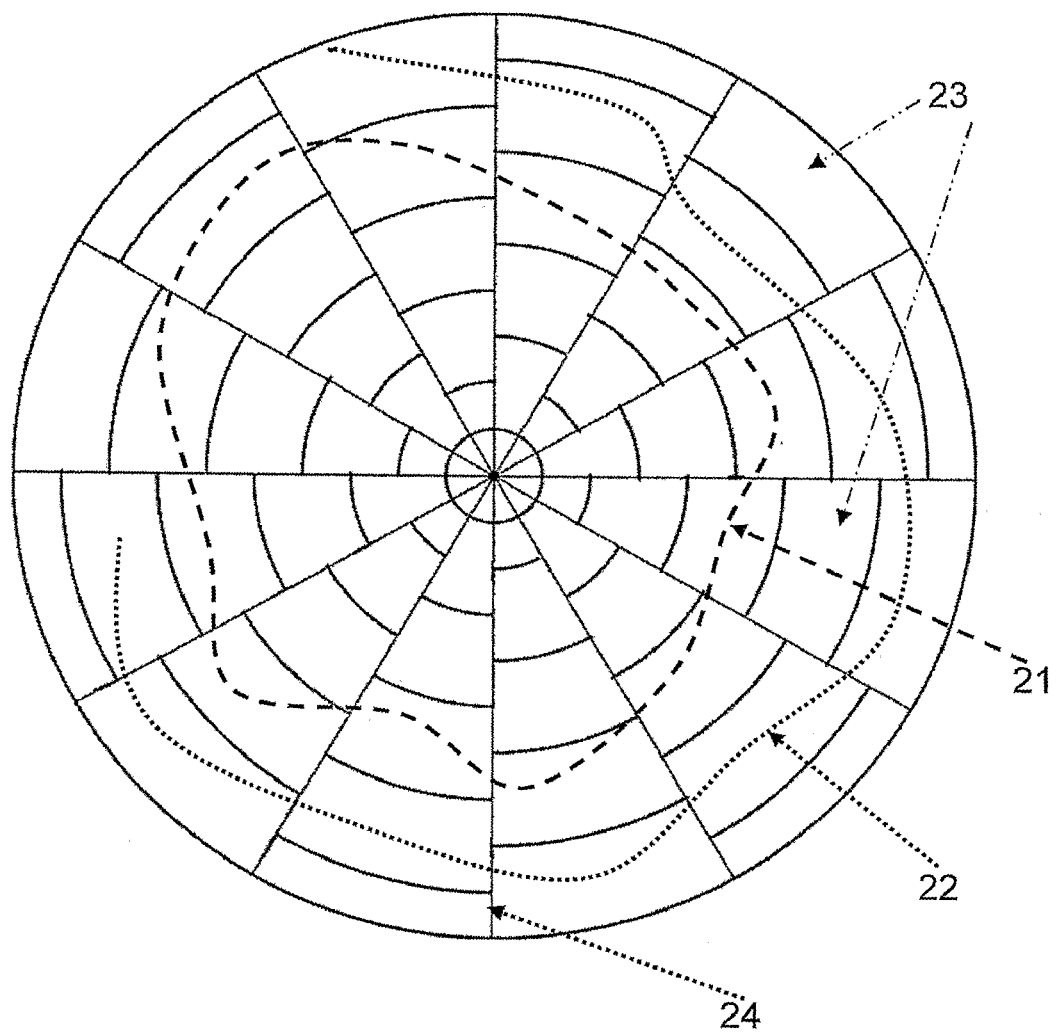
Figure 2A:
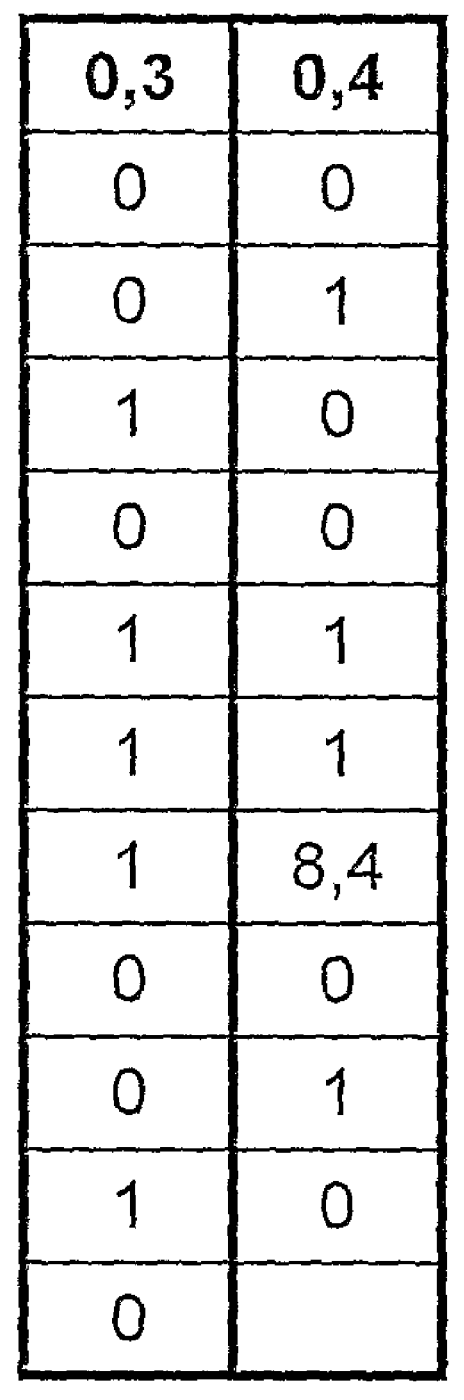
Figure 3:
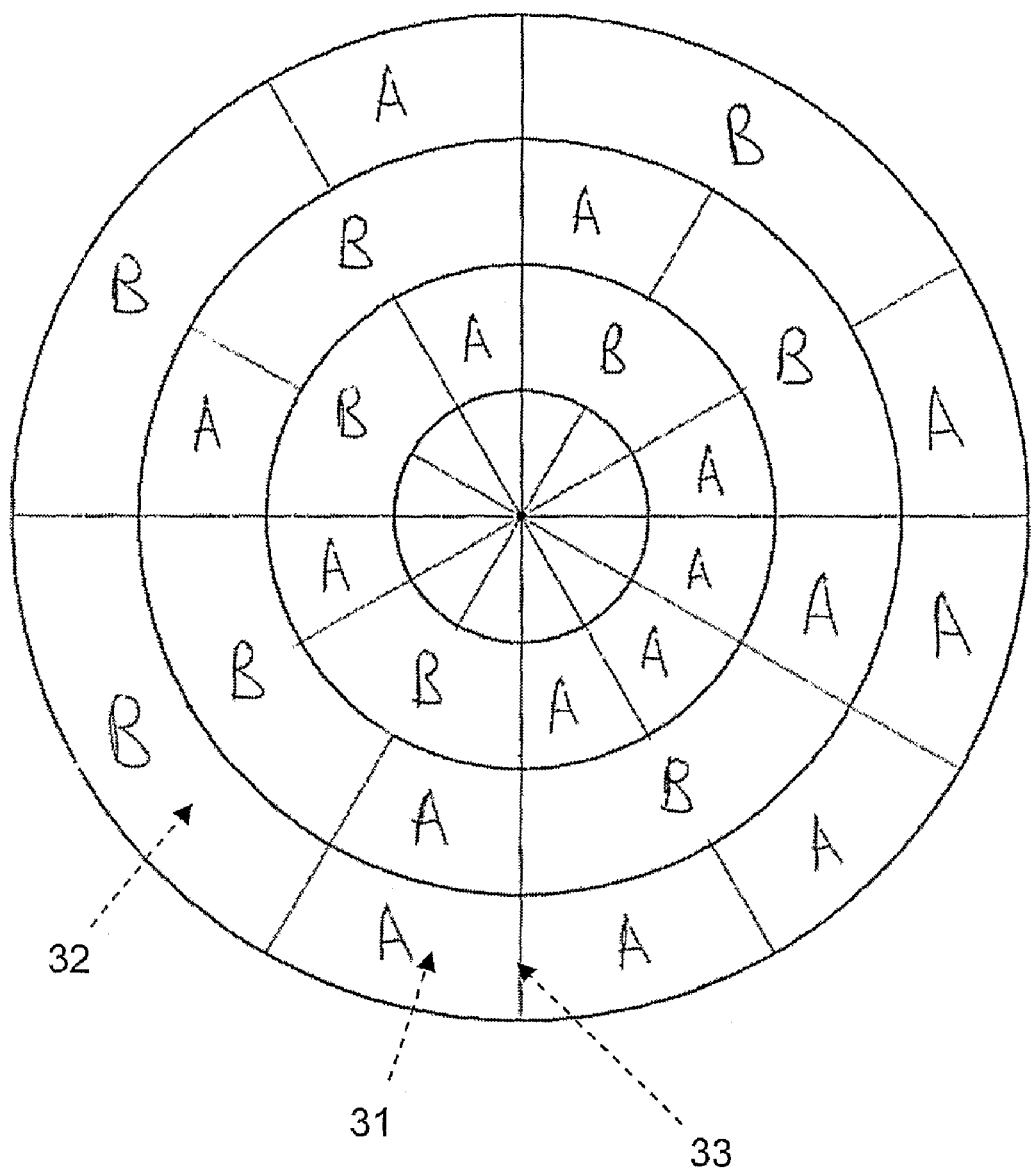

The GCLT will always have a zero coordinate on the disk (e.g. see (24) FIG. 2 & (33) FIG. 3) that is automatically recognized. The GCs location can be easily calculated based on GCs sizes and the GCLT. As an example of GCLT, see FIG. 2.A and FIG. 3.A.

FIG. 2.A is related to the example of radial modification. So the first row describes the initial locations that start the tracks, while the zeros represent a move towards the center while stepping forward to the next sector (GC) or the ones in outward direction respectively, both of them while moving in anti-clockwise direction. Whenever there is a gap the coordinate of the next track GC is given. So the left column represents the track starts from the disk-sector number 0, sector (GC) number 3 in the radial direction, while the right column represents the track starts in disk-sector number 0, sector (GC) number 4 in radial direction. FIG. 3.A is the GCLT related to case of angular modification. Each column is related to different track started from the cell coordinate given in the first row, while advancing in anti-clockwise direction. The zeros represent sectors (GCs) of type A, while the ones represent the sectors (GCs) of type B.

In accordance with certain embodiments of the invention the reading/writing process from GFM disk is performed by applying some optimization methods. These optimization methods are necessary to reduce the time per operation. The main criteria will be then minimal read/write header movement. Detailed description will be further elaborated in special sections referring to this issue. However, it is clear that any of the above Disk Format Modifications will be paid in terms of latency and more intensive read/write arm movements.

In accordance with certain embodiments of the invention, each disk (or a partition) can be formatted uniquely. In that case, there will be no other disk (or partition) that is formatted identically (i.e. with identical GCLT). In order to reach a unique format disk one has to implement a faithful random number generator, where the generated numbers are used for the GCLT creation. For example, one can think of mapping the even numbers to short GC sectors, while odd numbers will be mapped to long GC sectors (as demonstrated in FIG. 3 where (31) point to short GC sector, while (32) point to long GC sector). So the short-long GC sectors' sizes will be randomly ordered upon the tracks. Each of the above other methods will need its implementation.

In accordance with certain embodiments of the invention, the GFM as described so far enables hiding the data on a disk, if the disk format uniqueness is kept and the GCLT is accessible only to the certified data owner. This of course is due to the fundamental fact that without the GCLT availability to the operation system, the physical location of GCs is not available to the operation system. Therefore, the GCLT should be stored in at least one of the following ways:

Not on the same GFM disk, but elsewhere and accessible to the operating system.

It can be on the same disk but in an exact known location to the operating system.

It can be encrypted, to prevent easy use of an uncertified object.

It should be clear that if the disk is being scanned or analyzed physically in a lab by sensitive electromagnetic instrumentation, the stored data on a GFM disk and even the GCs shapes and sizes, in principle, can be revealed. This enables disk rescue operation in case of disk functionality failure. However, this is not a trivial process and might take very long time.

Since all the above described with regard to the GFM method is related to Low Level Format, one implements the GFM by modifying the disk controller hardware, when it is applied to disks. For Diskette, CD, DVD—like media it is done through the Low Level Format executed by the Format operation (which an integral part of any operating system).

In accordance with an aspect of the invention, there is provided the Randomly Scrambled Logical Sectors (RSLS). These sectors are addressed by the LBA—Logical Block Address—each sector (i.e. a block) is assigned a unique "sector number". In essence, the sectors are numbered 0, 1, 2, etc. up to (N−1), where N is the number of sectors on the disk. As described in the opening section, information that is stored on disk (or a partition) is stored in sectors. In the next few paragraphs, the methods of "hiding" the data on disk will be presented. The main idea is based on redirecting read/write operations to randomly selected locations, such that the end result is a completely scrambled disk. Instead of accessing sectors by their natural address, the addresses now get converted (redirected) to new addresses. The means by which the sectors are redirected is stored in an address lookup-table, which is hence termed "Shuffled LBA" (SLBA).

With this method, we do not touch the sectors physical (geometrical) location on disk as described in the former sections about the GFM method, but rather keep the standard formatting structure. However, it will be further clarified that both methods can be combined.

In accordance with certain embodiment of the invention, one scrambles the LBA. The term LBA without scrambling simply refers to the natural numbers 0, 1, 2 . . . n−1 that represent the sector numbers (or serial numbers).

Figure 4A:
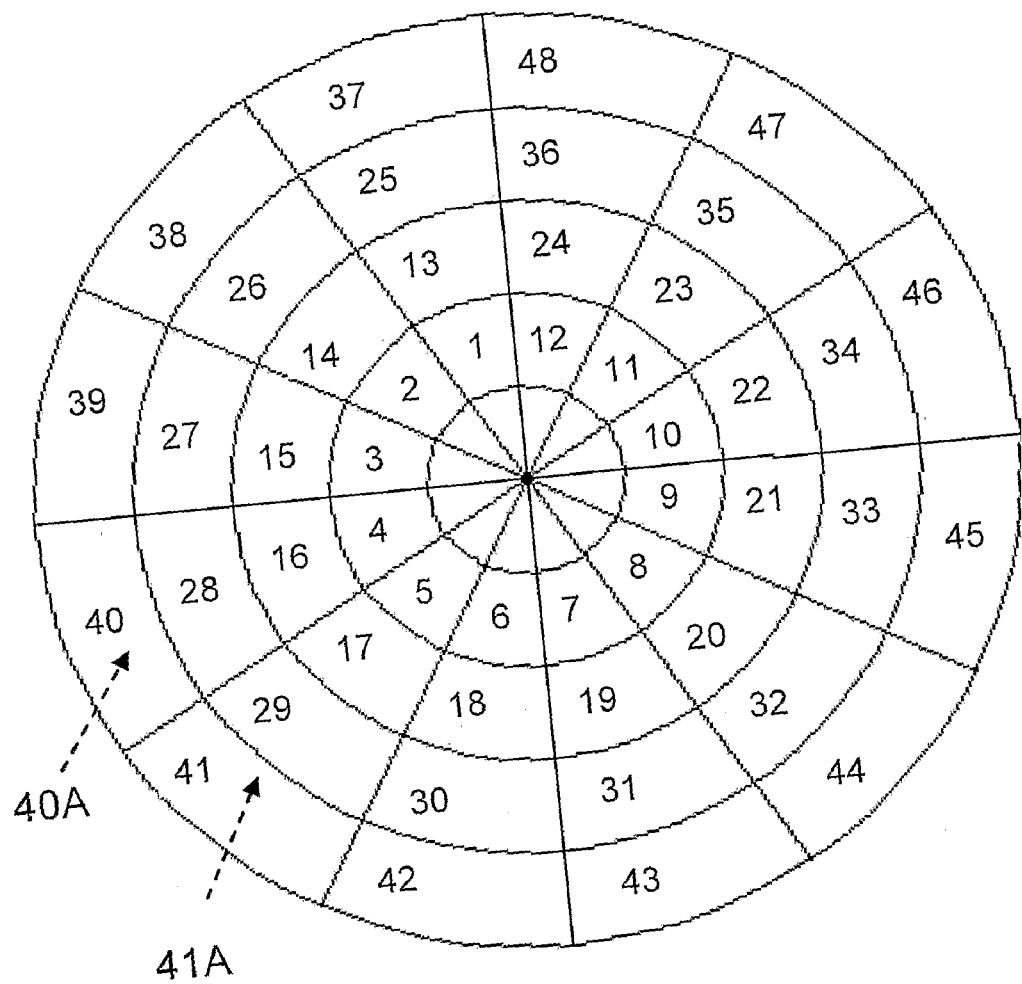
FIG. 4A-4B.—illustrates schematically Randomly Scrambled Logical Sectors, in accordance with an embodiment of the invention.
Figure 4B:
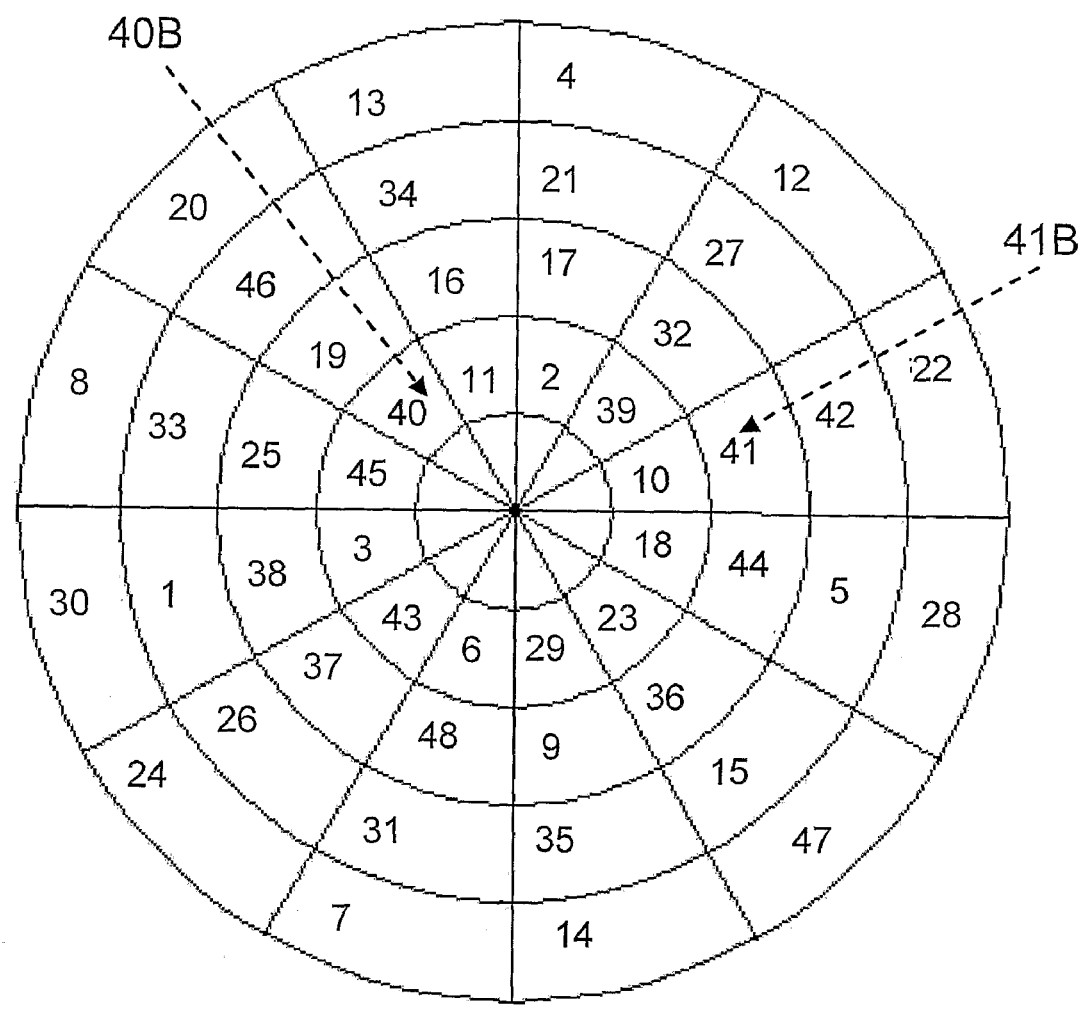

Randomly Scrambled LBA means randomly remapping or re-addressing of the sectors serial numbers. So each sector after the scrambling process is re-addressed. The mapping between the original LBA and the scrambled LBA is stored by another table called SLBA (or Shuffled LBA). See FIG. 4A which describes the sector address before scrambling (e.g. sector address 40 (40,A) & sector address 41 (41,A)) and FIG. 4B after the scrambling (e.g. sector address 40 (40,B) & sector address 41 (41,B)).

In accordance with certain embodiment of the invention, the scrambling process of the LBA can be done by scrambling only part of the LBA. So, one can scramble e.g. only the sectors which are related to specific disk partition. Yet another example can be inner scrambling of a given number of successive sectors.

In accordance with certain embodiment of the invention the scrambling process will be executed by (but not limited to) any random number generator. Eventually one would prefer random number generators which are certified by the regulations. Due to the fact that the number of sectors scrambled can reach more than hundreds of thousands, the scrambling uniqueness is quite assured (by using verified random generator). Therefore, each SLBA can be considered as unique due to the combinatorial factor.

It is clear that the higher the number of randomly re-addressed sectors, the higher the number of SLBA possibilities. Thus, SLBA entropy increases with the number of re-addressed sectors, where the term entropy, means the Logarithm of the number of indistinguishable equivalent states (which is N!, where N stands for the number of sectors scrambled and "!" represents Factorial operation). However, one should be careful here. The indistinguishable states are really equivalent if no data is stored on the re-addressed sectors. Any stored data on the re-addressed sectors, decreases the SLBA entropy. This should be analyzed at two levels. The first level is the logical level, while the second level is the physical level. At the logical level, one considers the following as distinguisher objects (and therefore entropy decreases): first—the very fact that a sector is "populated" by data distinguishes between the sectors with data and those without. Second—the fact that a data with special features is stored (e.g. a file) on more than one sector, would lead to find out the order of the sectors while trying to rebuild the sectors order, by reconstructing the file. At the physical level—if one tracks the disk with a very sensitive electromagnetic tool, it is possible to differentiate between "older" stored data and "newer" data. So these "quasi-dating" capabilities also decrease initial SLBA entropy. As part of certain embodiments of the invention a solution for this entropy decrease will be given in the next sections.

The fact that the sector addresses are scrambled does not prevent one from reading the sectors content one by one; each of them contains at least 512 Bytes. The scrambling just interrupts the operation system from working properly. Even if working irregularly, by activating reading of the sectors one by one, all the stored information will be revealed. If the data is a simple ASCII then it will be immediately revealed. Other known file structures such as Word, XSL, PDF, PS, etc. can be easily revealed too. Therefore, important information can be extracted from the disk content. The same problem exists for the GFM method, if one applies sensitive electromagnetic tools.

In order to keep the entropy as high as (or closer as possible to) the initial entropy, we apply in accordance with a certain embodiment of the invention, the following three steps:

In order to resolve the abovementioned issue of empty sectors, we suggest that "all" the randomly re-addressed sectors be "populated" with stored data. By this one means, even the "empty sectors" will have data (which of course is irrelevant to the disk users). So ab initio even an empty disk will be full of stored data. However, in the SLBA it will be indicated that "all" the sectors are actually empty. By the term "all" we mean "most of the sectors, where the higher is the better, up to all of the sectors".

Figure 5A:
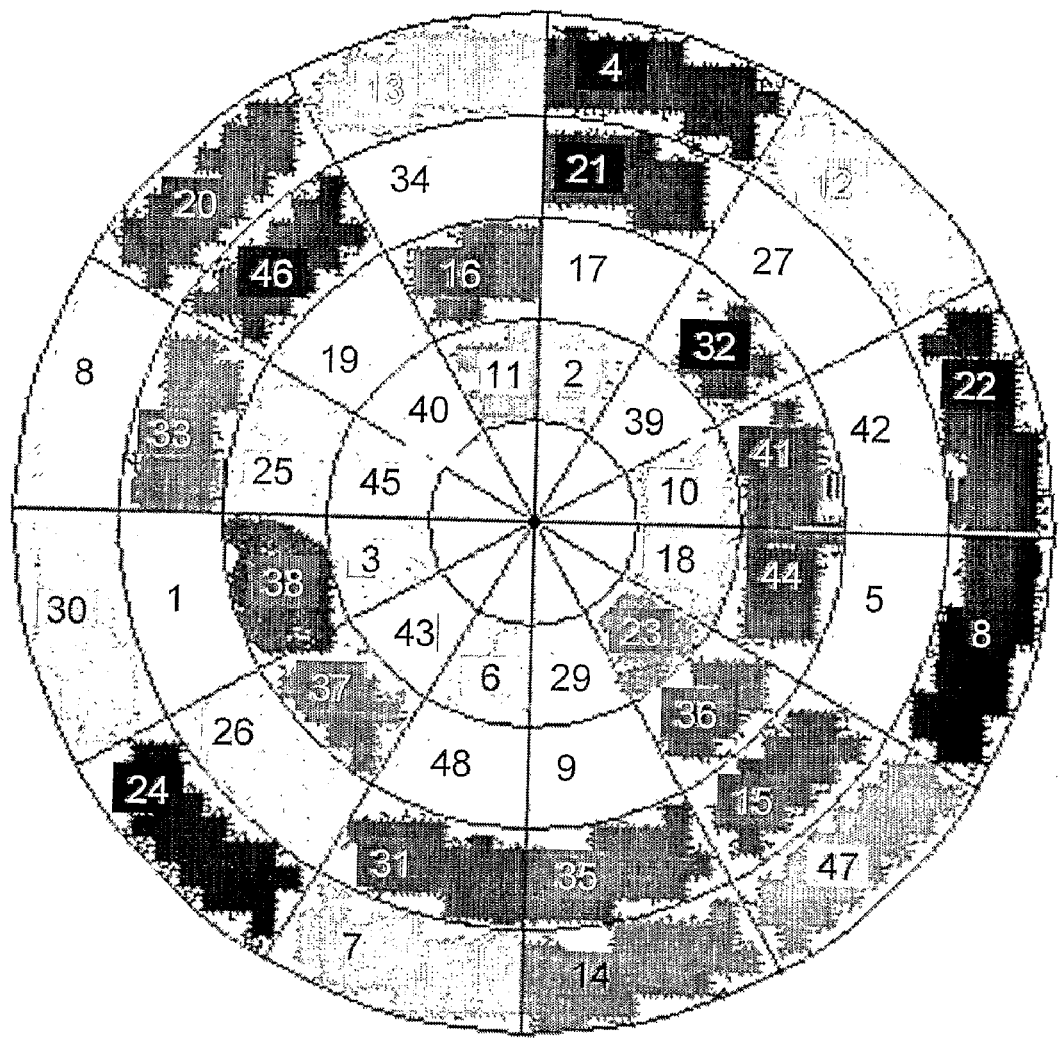

In order to resolve the abovementioned issues that sectors are readable one by one and that their content can be used for re-ordering of the sectors and the fact that it easy to distinguish between real data and fake data (as suggested above), all the data will be encrypted by a strong (if possible or needed regulated) algebraic encryption method (such as AES-128, AES-256, Camellia, etc.). Within this context the method of GED Algebraic Encryption Method (GAEM) will be further presented in more details later in this document. FIG. 5. illustrates the combination of sectors addresses scrambling with the implementation of algebraic encryption, where the different gray colored sectors demonstrate that the sectors are differently (and even uniquely as will be presented later in GAEM) encrypted.

In order to resolve the abovementioned issue of the electromagnetic sensitive analysis as a tool to weaken the encryption, the solution is by using an interference method based on randomly rewriting (i.e. renewing) of the data on the disk (or on the scrambled sectors only). This kind of operation can be executed in system idle time, regularly, or by any other user defined policy. Such an operation disrupts (and can even eliminates) the physical "dating" capabilities as described above. We called such an operation as Electro-Magnetic Dating Interference (EMDI). The EMDI will be further discussed in more details later in this document.

In accordance with a certain embodiment of the invention, the SLBA does not include only the information about the sector addresses scrambling, but also additional information as described in the former section (e.g. information about the encryption). It is also possible that it will be not as part of the SLBA itself, but will be in other tables, but it is clear that those tables will be linked to each other during system operation. The SLBA with the said extra data (whether it is in one table or in few tables) will be marked as GSLBA (which stands for Generalized SLBA). FIG. 5.A demonstrates GSLBA. The first column represents the original sectors. Whenever any referring to the original sectors is executed (e.g. reading/writing) the operation is executed on the shuffled sectors in the second column. The information on the encryption keys used and their order for each of the sectors is found in the $3^{rd}$ column. The keys' number are associated with yet another table of keys. The $4^{th}$ column represents whether the sector is already occupied or free (where in both cases the sectors are filled with data).

In accordance with a certain embodiment of the invention the GSLBA can be stored encrypted (preferably, but it is not a must), on another media (see FIG. 11); or hidden and encrypted on the same encrypted media. It is noted that using two media, a higher level of security is conferred, because in order to break the disk encryption one has to have access to both medias (the encrypted disk and the one which contains the GSLBA).

Figure 6:
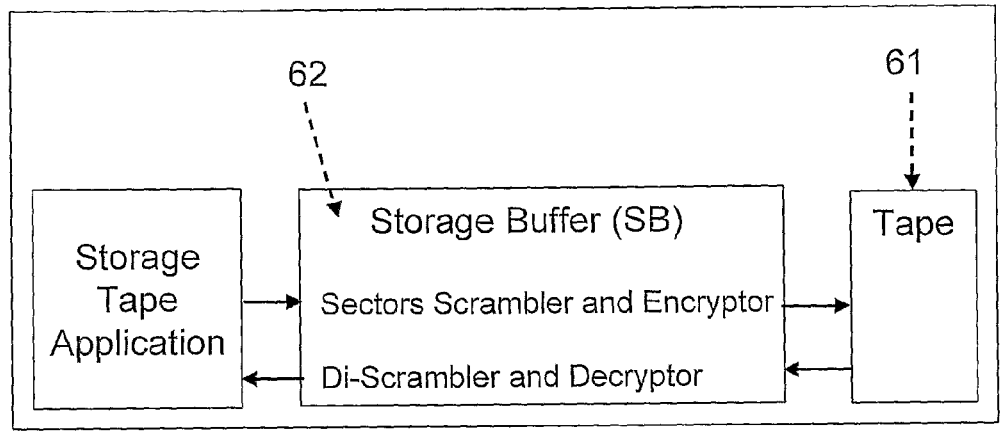
FIG. 6.—illustrates schematically a Tape Encryption Schematic, in accordance with an embodiment of the invention.

In accordance with a certain embodiment of the invention a similar method of sector addresses scrambling is applied to tapes ((61) FIG. 6.). However, since the tape geometry is totally different, the implementation method is different too. The way we apply the sector addresses scrambling method to the tape, is by creating a Storage Buffer (SB) ((62) FIG. 6.). Before the stream of data is written to the tape, it is kept temporarily within the SB. There, the scrambling method is implemented and then it is sent forward scrambled to the tape. As regards the SB size, on one hand it is clear that the larger the SB is, it is better from the entropy point of view; on the other hand the larger is the SB, the longer is the latency of the data transfer to the tape. However, tapes are usually used for backup, rather than online immediately available data storage. So, as regards the SB size, an optimized size is fixed. The issues discussed above relate to weaknesses due to the ability of reading the data sector by sector and that the file type can be recognized, and (where as above described) the solution that should be based on data encryption is relevant to tape sector address scrambling solution as well.

The process of reading from tape is identical to the writing but in reversed order of inverse operations. That is reading the data to the SB, descrambling, decrypting and forwarding it to the user application. (See FIG. 6).

Figure 7:
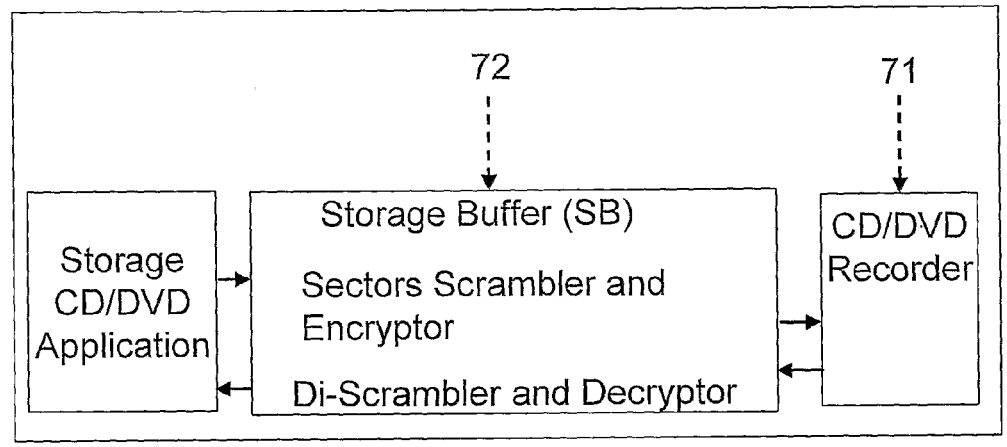
FIG. 7.—illustrates schematically a CD/DVD Encryption Schematic, in accordance with an embodiment of the invention.

In accordance with a certain embodiment of the invention we apply a similar method of sector addresses scrambling to any CD like and/or any DVD like and/or Non-Voltaic Memory like (e.g. Flash Memory) media ((71) FIG. 7.). The way we apply the sector scrambling is by creating a Storage Buffer (SB) ((72) FIG. 7.). Before the stream of data is written on the media, it is kept temporarily within the SB. There, the scrambling method is implemented and then it is sent forward scrambled to the media. As regards the SB size, on the one hand it is clear that the larger the SB is, it is better from the entropy point of view; on the other hand the larger the SB, the longer is the latency of the data transfer to the media. The issues discussed above relate to weaknesses due to the ability of reading the data sector by sector and that the file type can be recognized, and the above described solutions are relevant here as well. The reading process from media is executed in exactly the same way as the writing but in the reversed order of inverse operations. That is reading the data to the SB, descrambling, decrypting and forward it to the user application. This RSLS (and/or GFM) method, especially when applied to any CD like and/or any DVD like media can be very useful as a method for RIGHTS PROTECTION. Since, without the GSLBA (and/or the GCLT in case of GFM), the rights protected data on the media is practically useless.

In accordance with an aspect of the invention, there is provided Global Encrypted Disk (GED) and GED Algebraic Encryption Method (GAEM). These are terms used for a disk (or a disk partition) which is fully encrypted (e.g. by the GFM and/or RSLS methods as described in the former sections). Moreover, all the sectors and/or GCs of the disk contain data (so no empty sector and/or GCs will be found on the disk or the partition); therefore the term "Global" is used. The term Algebraic Encryption Method represents an encryption method which actually is inter-bit-manipulations, while preserving the length of the encrypted data. Known Algebraic Encryption Methods are DES, AES, RSA, Camellia, etc. In accordance with a certain embodiment of the invention, regarding the prevention of revealing each sector's content both in the GFM method and the RSLS method; an algebraic encryption is applied to each of the sectors content.

Thus, implementing algebraic encryption involves a key. A use of one key means that all the information will be encrypted with one key based upon one algebraic method. This could be problematic. The weakness of a one key use is that by successful decryption of one sector, all the GED will be revealed. Moreover, one can deliberately store to the disk predetermined information while weakening the encryption power to a great extent.

Thus, as a certain embodiment of the invention, it is preferable to apply more than one algebraic encryption key and even use more than one algebraic encryption method. As regards to how to implement such a method, one considers the following methods:

A method with one algebraic encryption method, with more than one key, where the keys are randomly chosen from a set of keys. Thus a single sector can be encrypted in an all key combinatorial option. It is preferable (but not necessary) that the set of keys will be predefined and will be as part of the GCLT and/or GSLBA.

e.g. assume a sector of 4096 bit, an algebraic encryption method with 256 bit key and a set of 100 keys. So first, one sees that the sector should be encrypted by 16 keys. The keys are randomly picked from the set of the 100 keys. As one can see the combinatorial factors as regards the number of key orders is enormous.

A method with more than one algebraic encryption method, where each of the algebraic encryption methods (independently) involves one or more keys as described in the former above method. The algebraic encryption methods can be combined in few ways.

A method where each sector is encrypted by few algebraic encryption methods, where the first n-th bits are encrypted by one method with n-bits key long, and then the rest of the bits within the sector are encrypted in the same way by the other methods.

A method where some of the sectors will be encrypted by one method and some by other methods, but the methods will be randomly switched between sectors.

A method where each sector is fully encrypted by one method and then encrypted by yet another encryption method. The methods will be randomly chosen from a set of methods.

FIG. 5 with all the different gray colored sectors, demonstrates that each of the sectors is differently algebraically encrypted. As one can notice by the embodiment, the whole disk is filled with encrypted data. FIG. 5.A further demonstrates an example of GSLBA which contains the relevant data for operation.

In accordance with an aspect of the invention, there is provided Electro-Magnetic Dating Interference (EMDI). It is known that Electro-Magnetic Instruments (EMI) used by companies that deal with disk rescuing/recovering, are so sensitive that they enable extraordinary capabilities (e.g. data recovery in cases such as: post disk reformatting, physically deleted data, and even sometimes in cases where physically a sector has been already rewritten by new data).

Furthermore, there is a fully described method on how the bits of a flash memory can be directly read from the memory cells, without the need of the logical module usually associated with the non-voltaic memory module.

As regards disks, full scanning of a disk by EMIs can chronologically order, up to a certain level, the content aging. It can be done by Electro-Magnetic Intensity Analysis. Fading, intensity decaying, smearing and other physical features can be used as data aging indicators. Therefore, they can greatly reduce the power of the sector scrambling algorithm (RSLS). Even the geometrical format modification (GFM), can be detected by the EMIs. Although this might be a long and complex process, it is possible!

Therefore, further interference actions are desired. The straightforward interference action (as already noted) which is also a certain embodiment of the invention is to randomly select sectors (or GCs in the case of GFM) and refresh/renew the sector content. It should be mentioned again that we apply also the GAEM (see above) method as part of "keeping the entropy as high as it was in the beginning". Now, given that all the sectors (and/or GCs) on the disk/partition contain real encrypted data [even the "not used yet" sectors (and/or GCs)]; it follows that the refreshing/renewing of sectors (and/or GCs) content, includes all the sectors (and/or GCs) of the disk/partition. This refreshing/renewing operation misleads the process of chronological ordering by EMIs. So, the result outcome of EMIs attempts for "chronological dating" will fail.

Figure 8:
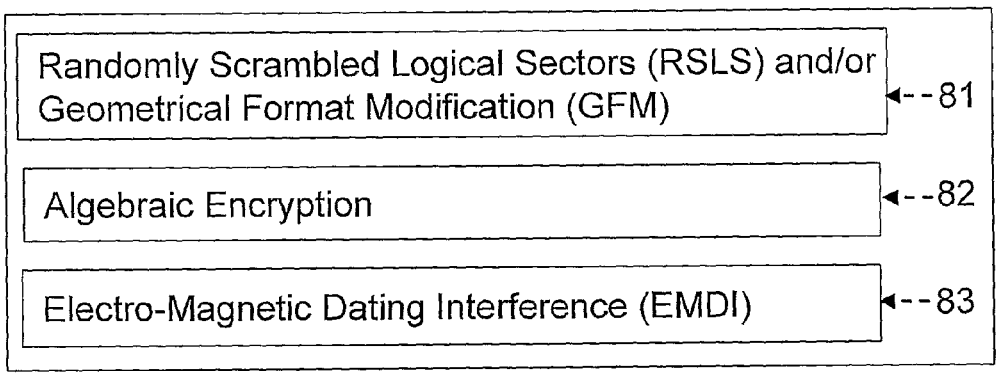

In accordance with some aspects of the invention, there are provided some optimization methods and operative aspects. The methods described so far for data storage protection and encryption can be summarized as three levels (or layers) of operation (see (81), (82), (83)—FIG. 8.—respectively). All three levels are executed in order to preserve the entropy at a satisfactorily high level, starting from the beginning of the disk usage. Keeping the entropy high all the way cannot be done without this affecting performance. In this section some of the operations that are applied in order to improve the disk (and/or the tape) performance, while reducing the performance cost to an acceptable value are described. Although some optimization is performed regularly by the storage operating system, due to the modifications to the disk (and/or tape) operation that were implemented, some of the storage system operations have to be modified and even blocked, e.g. there is no point in performing a Defrag operation on a scrambled disk.

Figure 11A:
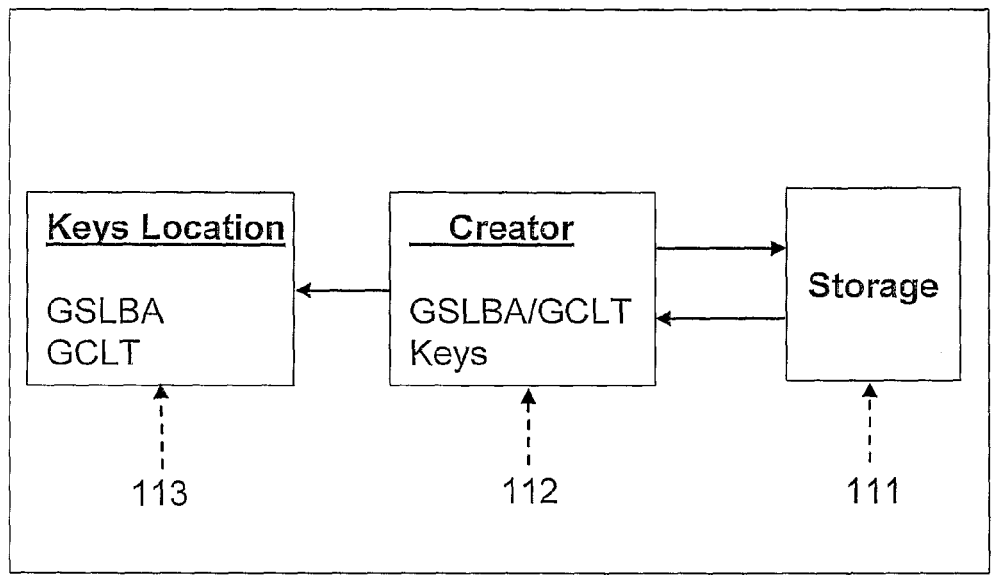
FIG. 11A-11B.—illustrates schematically Protected/Encrypted Storage in Operation Mode, in accordance with an embodiment of the invention.
Figure 11B:
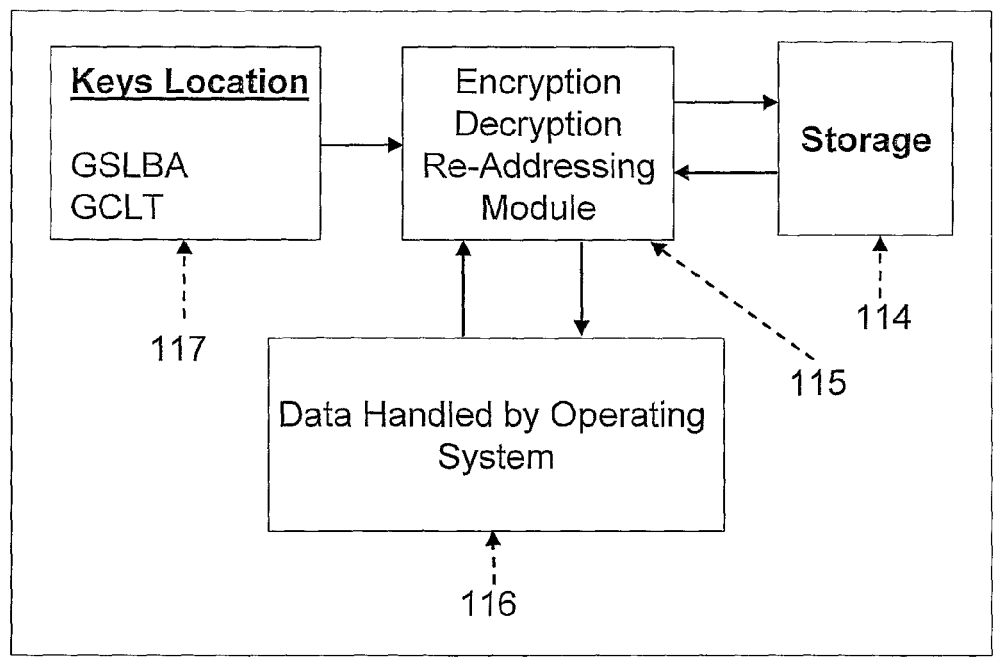

First Initialization—(FIG. 11.A) In accordance with a certain embodiment of the invention, all information with regard to the storage (a disk and/or a tape) ((111) FIG. 11.A) protection and encryption is prepared before the storage is available for live operation ((112), (113)—FIG. 11.A). It is clear that if a new hot swap disk is inserted to the storage, those initialized operations will be performed without interrupting the live storage system. Only upon completion of the initialized preparation the disk will be ready for the whole encrypted protected storage.

Figure 9:
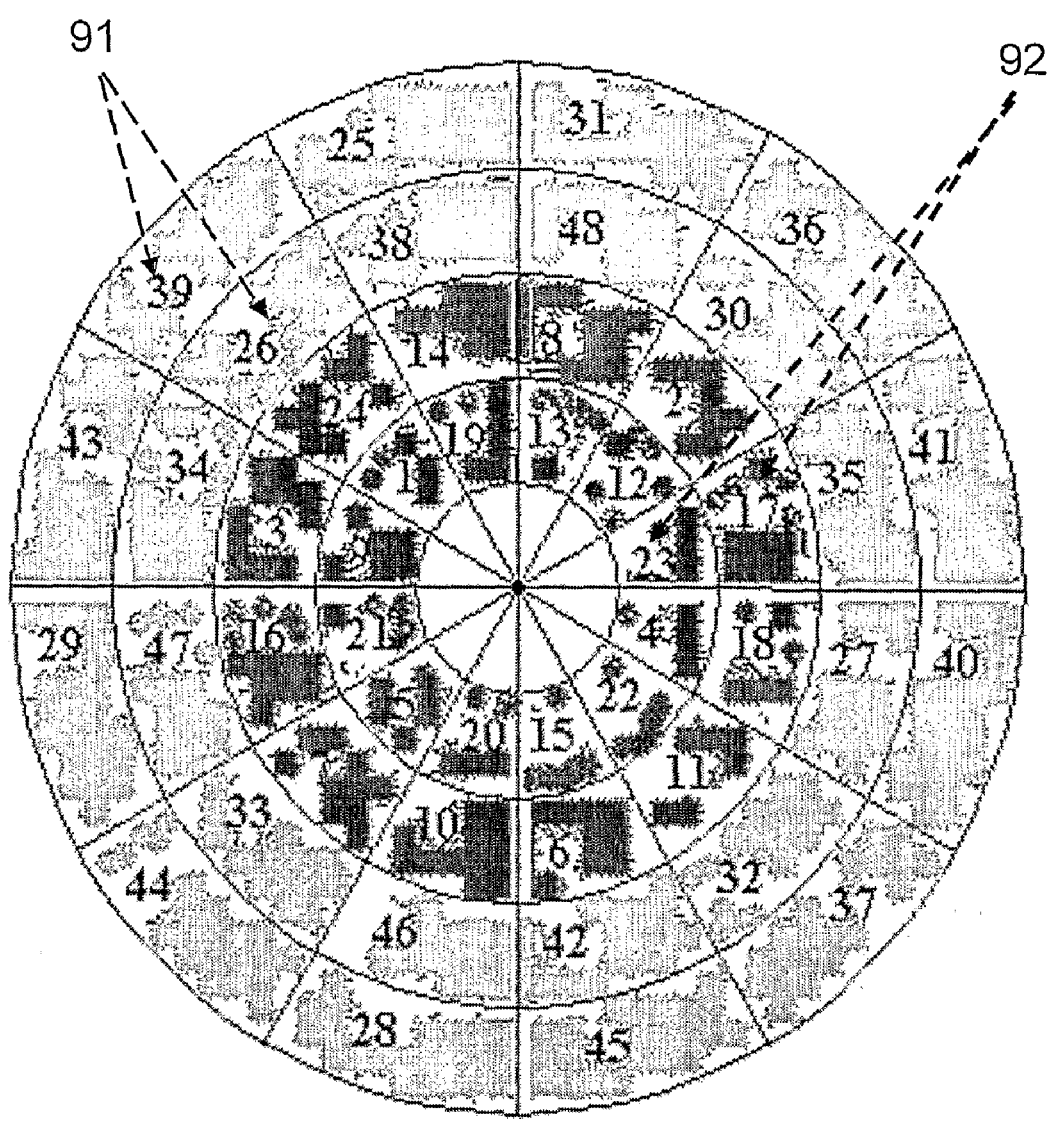
FIG. 9.—illustrates schematically Randomly Scrambled Sectors Distributed Over Two Tracks, in accordance with an embodiment of the invention.

Furthermore, within the initialization process as regards the sector addresses scrambling (as regards the RSLS method), we apply in accordance with a certain embodiment of the invention the method of Neighboring-Tracks Sector Scrambling (NTSS). If one had scrambled all the sectors on a given disk, the disk electromagnetic arm-header that reads and writes the information to the disk would have moved upon the whole disk, while slowing the disk operation tremendously. The NTSS method means that first one should fix the required encryption power. Then, based on that, one finds how many sectors should be scrambled at once to reach the desired encryption power. Therefore the sectors on the disk will be divided to groups, where each group contains at least the number of sectors desired (but not much more than this number), and all of the sectors in each of the groups are either sequential (before the scrambling) therefore found upon vicinity tracks, or taking an integral number of neighboring tracks with all the sectors found on them. This means that the scrambling sectors in each of the groups is controlled, and the disk read/write header movement will be physically in limited disk zone in average. FIG. 9 demonstrates the NTSS idea. The colored tracks represent the tracks from which the sectors were randomly picked and scrambled. So e.g. (91) FIG. 9 represents the two outer tracks within the sectors address were scrambled, while (92) FIG. 9 represents the same for the two inner tracks.

Figure 10:
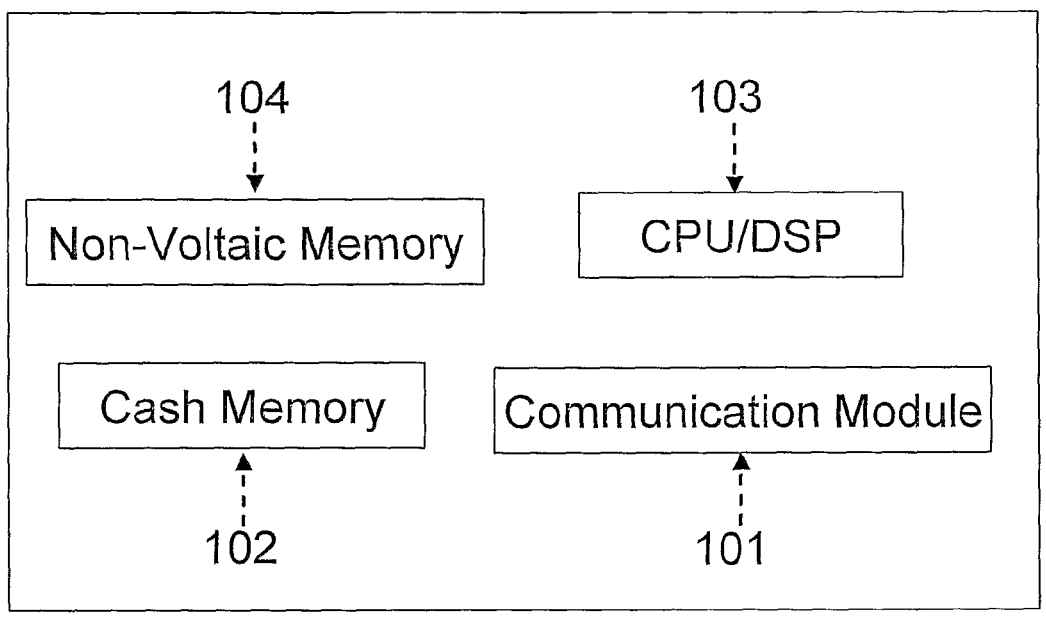
FIG. 10.—illustrates schematically Scramblers and Encryption Board Major Modules, in accordance with an embodiment of the invention.

Operation—In accordance with a certain embodiment of the invention, all the tables that contain all the information on the storage encryption and protection (e.g. the GCLT and/or GSLBA), are cached to very fast memory modules ((117) FIG. 11.B), and will always be accessed to the encryption/decryption operation module ((115) FIG. 1.B). Furthermore, in accordance with a certain embodiment of the invention, dedicated hardware module which has the desired features boost the encryption/decryption operation to the storage. The necessary modules (but not limited to these only) (see FIG. 10.) are:

Data communication module ((101) FIG. 10.) that can handle the data content to be written to (or to be read from) the storage (e.g. PCI, PCI-X, PCI-E, SCSI, ISCSI, ATA, PATA, SATA, FC, etc.), and that can communicate with the modules where the GCLT and/or GSLBA are found.

Fast cache memory ((102) FIG. 10.) for embedding the encryption/decryption tables, and for any other use of the CPU.

CPU (and/or other processing modules such a DSP) ((103) FIG. 10.) for fast executing the algebraic encryption and all the other live operations are also needed for the first initialization of the "to be protected/encrypted" storage as described above. The CPU is also needed for the "idle time operation" as described with regard to randomly rewriting/renewing of sectors (and/or GCs). Bootable Non-Voltaic memory ((104) FIG. 10.), where the protecting and the encrypting/decrypting software is stored.

Read/Write optimization—It is known that optimization methods are implemented by different operating systems, in order to maintain high performance of the storage. Among the optimized methods, one finds:

A preference for sequential sectors writing in order to reduce the arm moves to a minimum required. This of course also improves the read operation. This is implemented by sectors/blocks (to be stored to the disk) accumulation for a very short time, organizing them in increasing or decreasing series of their logical addresses, before storing them on the disk.

Defrag operation causes the data to be stored to the disk as continuously as possible, where files will be continuously/sequentially written to the disk. It also differs between temporary data that are kept on different locations since it is assumed that it will soon be deleted.

Automatic storage operation, that automatically transfers old data that is not accessed for a long time to tapes archiving, where the accessed time is much longer. Thus new disk empty places are available for new data to be stored.

Some of the raids configurations are designed to improve the disks read/write performance.

The abovementioned optimization operations are just examples, and other methods are possible. However, all of them were developed for normal storage operation, i.e. without the storage protection/encryption operations. Therefore, some of the optimization methods cannot be implemented at all (and even should be forbidden, e.g. the defrag operation), some can be implemented with some modifications, and some new methods have been specially developed. Therefore, in accordance with a certain embodiment of the invention, optimization methods compatible with protected/encrypted storage methodology, are presented. For disk reading/writing optimizations there are a few aspects to be considered. Firstly, the reading/writing execution time that one prefers to be the shortest as possible, should be considered. Secondly, a minimal number of moves for the reading/writing arm should be considered. Implementing this aspect ensures longer disk life, and minimum of noise during operation. Further, it should be noticed that any optimization should be strongly related to the disk physical features. For example—the disk RPM (Rounds Per Minutes), the arm speed, the number of plates/heads, the disk density, etc. all should be considered and be part of the optimization algorithm as implemented by the low level disk software driver installed to the OS. Furthermore, different GFMs methods will lead to different optimization methods.

It is of extreme importance to apply an optimization method on the performance, especially while implementing GFM and/or RSLS methods. In lab experiments of RSLS implementation starting with no optimization and with totally scrambled 20 GB disk about 90% extra latency was obtained, as compared to normal work of reading/writing from a disk (not speaking of the loud noise heard due to the arm moves). After applying an optimization algorithm the extra latency (as well as the noise) was reduced to about 10%. Further implementing the NTSS method above discussed, can reduce the extra latency to a value of less than 1%.

The present invention has been described with a certain degree of particularity, but those versed in the art will readily appreciate that various alterations and modifications may be carried out, without departing from the scope of the following Claims:

The invention claimed is:

1. A method of dividing a computer readable disk that includes at least one track and the track is divided into at least two geometrical cells (GCs), comprising:
   dividing at least one of the at least one track on the computer readable disk into at least two neighboring geometrical cells (GCs); at least one of said GCs is bordered by at least one of a different internal radius or different outer radius compared to the respective radius of a neighboring cell of said track; and
   storing a Geometrical Cell Location Table (GCLT), for accessing data in said cells, said accessing include inserting or updating or deleting data;
   wherein said GCLT is encrypted.

2. the method according to claim 1, wherein said GCLT is stored in different medium than said disk.

3. The method according to claim 1, further comprising encrypting data in at least one of said cells.

4. The method according to claim 3, wherein said encrypting includes encrypting data in a cell utilizing at least two keys, each key being used to encrypt part of the data in said cell.

5. The method according to claim 3, wherein said encrypting includes encrypting data in a cell utilizing at least two encryption algorithms, each algorithm being used to encrypt part of the data in said cell.

6. A method of dividing a computer readable disk that includes at least one track and the track is divided into at least two geometrical cells (GCs), comprising:
   dividing at least one of the at least one track on the computer readable disk into at least two neighboring geometrical cells (GCs); at least one of said GCs defining a different angular size compared to the angular size of a neighboring GC of said track; and
   storing a Geometrical Cell Location Table (GCLT), for accessing data in said cells, said accessing includes inserting, updating or deleting data;
   wherein said GCLT is encrypted.

7. The method according to claim 6, wherein said GCLT is stored in different medium than said disk.

8. The method according to claim 6, further comprising encrypting data in at least one of said cells.

9. The method according to claim 8, wherein said encrypting includes encrypting data in a cell utilizing at least two keys, each key being used to encrypt part of the data in said cell.

10. The method according to claim 8, wherein said encrypting includes encrypting data in a cell utilizing at least two encryption algorithms, each algorithm being used to encrypt part of the data in said cell.

11. A method of dividing a computer readable disk that includes at least one track and the track is divided into at least two geometrical cells (GCs), comprising:
    dividing at least one of the at least one track on the computer readable disk into at least two neighboring geometrical cells (GCs); at least one of said GCs is bordered by at least one of a different internal radius or different outer radius compared to the respective radius of a neighboring cell of said track;
    storing a Geometrical Cell Location Table (GCLT), for accessing data in said cells, said accessing include inserting or updating or deleting data; and shuffling said Geometrical Cell Location Table, giving rise to Shuffled Geometrical Cell Location Table (SGCLT), such that a GC from among said at least one GCs having a GC address in said GCLT will have a different address in said SGCLT; said GCLT facilitating access of cell of interest.

12. The method according to claim 11, wherein said SGCLT is stored in a different medium than said disk.

13. The method according to claim 11, wherein said SGCLT is encrypted.

14. A method of dividing a computer readable disk that includes at least one track and the track is divided into at least two geometrical cells (GCs), comprising:
    dividing at least one of the at least one track of the computer readable disk into at least two neighboring geometrical cells (GCs); at least one of said GCs defining a different angular size compared to the angular size of a neighboring GC of said track;
    storing a Geometrical Cell Location Table (GCLT), for accessing data in said cells, said accessing includes inserting, updating or deleting data; and
    shuffling said Geometrical Cell Location Table, giving rise to Shuffled Geometrical Cell Location Table (SGCLT), such that a GC from among said at least one GCs having a GC address in said GCLT will have a different address in said SGCLT; said GCLT facilitating access of cell of interest.

15. The method according to claim 14, wherein said SGCLT is stored in a different medium than said disk.

16. The method according to claim 14, wherein said SGCLT is encrypted.

17. A method of dividing a computer readable disk that includes at least one track and the track is divided into at least two geometrical cells (GCs), comprising:
    dividing at least one of the at least one track of the computer readable disk into at least two neighboring geometrical cells (GCs); at least one of said GCs is bordered by at least one of a different internal radius or different outer radius compared to the respective radius of a neighboring cell of said track;
    at least one of said GCs defining a different angular size compared to the angular size of a neighboring GC of said track;

storing a Geometrical Cell Location Table (GCLT), for accessing data in said cells, said accessing includes inserting, updating or deleting data; and shuffling said Geometrical Cell Location Table, giving rise to Shuffled Geometrical Cell Location Table (SGCLT), such that a GC from among said at least one GCs having a GC address in said GCLT will have a different address in said SGCLT; said GCLT facilitating access of cell of interest.

18. The method according to claim 17, wherein the GC stipulated as bordered by at least one of a different internal radius or different outer radius and defining a different angular size is one GC and the neighboring GC is a second GC.

19. The method according to claim 17, wherein said SGCLT is stored in a different medium that said disk.

20. The method according to claim 17, further comprising encrypting data in at least one of said cells.

21. The method according to claim 20, wherein said encrypting includes encrypting data in a cell utilizing at least two keys, each key being used to encrypt part of the data in said cell.

22. The method according to claim 20, wherein said encrypting includes encrypting data in a cell utilizing at least two encryption algorithms, each algorithm being used to encrypt part of the data in said cell.

23. The method according to claim 17, wherein said SGCLT is stored in a different medium than said disk.

24. The method according to claim 17, wherein said SGCLT is encrypted.

25. A method of dividing a computer readable disk that includes at least one track, said track is divided into at least two geometrical cells (GCs), comprising:

dividing at least one of the at least one track of the computer readable disk into geometrical cells (GCs); at least one of said GCs is bordered by at least different internal radius or different outer radius compared to the respective radius of a neighboring cell of said track;

at least one of said GCs defining a different angular size compared to the angular size of a neighboring GC of said track; and storing a Geometrical Cell Location Table (GCLT), for accessing data in said cells, said accessing include inserting or updating or deleting data;

wherein said GCLT is encrypted.

26. A method of renewing content in a computer readable disk, the disk includes at least one track and the track is divided into at least two geometrical cells (GCs), comprising:

dividing the computer readable disk into tracks and geometrical cells (GCs) constituting sectors and constructing Logical Block Address (LBA) for facilitating access of sector of interest;

storing data in said sectors;

shuffling at least two of said sectors addresses, giving rise to Shuffled LBA (SLBA), such that a sector from among said at least one sectors having a sector address in said LBA will have a different address in said SLBA; said SLBA facilitating access of sector of interest; and renewing content of selected sectors according to a predefined criterion, thereby hindering the possibility of dating data based on aging.

27. The method according to claim 26, wherein said SLBA is stored in a different medium than said disk.

28. The method according to claim 26, wherein said SLBA is encrypted.

29. The method according to claim 26, further comprising: encrypting data in at least one of said sectors.

30. The method according to claim 29, wherein said encrypting includes encrypting data in a sector utilizing at least two keys, each key being used to encrypt part of the data in said sector.

31. The method according to claim 29, wherein said encrypting includes encrypting data in a sector utilizing at least two encryption algorithms, each algorithm being used to encrypt part of the data in said sector.

32. A method of renewing content in a computer readable disk, the disk includes at least one track and the track is divided into at least two geometrical cells (GCs), comprising:

dividing the computer readable disk into tracks and geometrical cells (GCs) constituting sectors and constructing Logical Block Address (LBA) for facilitating access of sector of interest;

storing data in said sectors;

encrypting data in at least one of said sectors, wherein said encrypting includes encrypting data in a sector utilizing at least two keys, each key being used to encrypt part of the data in said sector; and renewing content of selected sectors according to a predefined criterion, thereby hindering the possibility of dating data based on aging.

33. A method of renewing content in a computer readable disk, the disk includes at least one track and the track is divided into at least two geometrical cells (GCs), comprising:

dividing the computer readable disk into tracks and geometrical cells (GCs) constituting sectors and constructing Logical Block Address (LBA) for facilitating access of sector of interest;

storing data in said sectors;

encrypting data in at least one of said sectors, wherein said encrypting includes encrypting data in a sector utilizing at least two encryption algorithms, each algorithm being used to encrypt part of the data in said sector; and renewing content of selected sectors according to a predefined criterion, thereby hindering the possibility of dating data based on aging.

* * * * *

UNITED STATES PATENT AND TRADEMARK OFFICE
CERTIFICATE OF CORRECTION

PATENT NO. : 8,108,693 B2  
APPLICATION NO. : 11/910393  
DATED : January 31, 2012  
INVENTOR(S) : Atzmon et al.

Page 1 of 1

It is certified that error appears in the above-identified patent and that said Letters Patent is hereby corrected as shown below:

On the Title page, please add the following, Item (60):

-- Related U.S. Application Data

(60) Provisional application No. 60/667,035, filed on April 1, 2005 --

Signed and Sealed this
Fifth Day of June, 2012

David J. Kappos
*Director of the United States Patent and Trademark Office*